(12) United States Patent
Velusamy et al.

(10) Patent No.: US 9,110,501 B2
(45) Date of Patent: Aug. 18, 2015

(54) METHOD AND APPARATUS FOR DETECTING TALKING SEGMENTS IN A VIDEO SEQUENCE USING VISUAL CUES

(71) Applicant: SAMSUNG ELECTRONICS CO., LTD., Suwon-si (KR)

(72) Inventors: Sudha Velusamy, Bangalore (IN); Viswanath Gopalakrishnan, Bangalore (IN); Bilva Bhalachandra Navathe, Bangalore (IN); Anshul Sharma, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 245 days.

(21) Appl. No.: 13/800,486

(22) Filed: Mar. 13, 2013

(65) Prior Publication Data
US 2013/0271361 A1    Oct. 17, 2013

(30) Foreign Application Priority Data

Apr. 17, 2012    (IN) .......................... 1519/CHE/2012
Aug. 7, 2012     (KR) ........................ 10-2012-0086189

(51) Int. Cl.
*G06K 9/00* (2006.01)
*G06F 3/01* (2006.01)
*G06K 9/46* (2006.01)

(52) U.S. Cl.
CPC ............ *G06F 3/011* (2013.01); *G06K 9/00335* (2013.01); *G06K 9/4642* (2013.01); *G06K 2009/4666* (2013.01)

(58) Field of Classification Search
USPC .......................................... 382/118, 168, 170
See application file for complete search history.

(56) References Cited

U.S. PATENT DOCUMENTS

| 7,130,453 | B2 * | 10/2006 | Kondo et al. ................. 382/117 |
| 2008/0212850 | A1 * | 9/2008 | Adachi et al. ................. 382/118 |
| 2009/0304088 | A1 * | 12/2009 | Kodaka ..................... 375/240.25 |
| 2010/0296706 | A1 * | 11/2010 | Kaneda et al. ................. 382/118 |
| 2011/0058713 | A1 | 3/2011 | Kogane et al. |
| 2012/0274755 | A1 * | 11/2012 | Sinha et al. ..................... 348/77 |

FOREIGN PATENT DOCUMENTS

| JP | 10-228295 | 8/1998 |
| JP | 2001-43345 | 2/2001 |

(Continued)

*Primary Examiner* — Phuoc Tran
(74) *Attorney, Agent, or Firm* — NSIP Law

(57) ABSTRACT

A method and system for detecting temporal segments of talking faces in a video sequence using visual cues. The system detects talking segments by classifying talking and non-talking segments in a sequence of image frames using visual cues. The present disclosure detects temporal segments of talking faces in video sequences by first localizing face, eyes, and hence, a mouth region. Then, the localized mouth regions across the video frames are encoded in terms of integrated gradient histogram (IGH) of visual features and quantified using evaluated entropy of the IGH. The time series data of entropy values from each frame is further clustered using online temporal segmentation (K-Means clustering) algorithm to distinguish talking mouth patterns from other mouth movements. Such segmented time series data is then used to enhance the emotion recognition system.

20 Claims, 3 Drawing Sheets

(56) References Cited

FOREIGN PATENT DOCUMENTS

| JP | 2005-293539 | 10/2005 |
| JP | 2007-65969 | 3/2007 |
| JP | 2008-146268 | 6/2008 |
| JP | 2008-146318 | 6/2008 |
| JP | 2011-81445 | 4/2011 |
| KR | 10-2008-0111325 | 12/2008 |

* cited by examiner

METHOD AND APPARATUS FOR DETECTING TALKING SEGMENTS IN A VIDEO SEQUENCE USING VISUAL CUES

CROSS-REFERENCE TO RELATED APPLICATIONS

This application claims the priority benefit of Indian Patent Application No. 1519/CHE/2012, filed on Apr. 17, 2012, in the Indian Patent Office, and Korean Patent Application No. 10-2012-0086189, filed on Aug. 7, 2012, in the Korean Intellectual Property Office, the disclosures of each of which are incorporated herein by reference.

BACKGROUND

1. Field

Example embodiments of the following disclosure relate to image processing, computer vision and machine learning, and more particularly, relate to emotion recognition in a video sequence.

2. Description of the Related Art

With recent developments in technology, significant attention has been given to enhancing human computer interaction (HCI). In particular, engineers and scientists are attempting to capitalize from basic human attributes, such as voice, gaze, gesture and emotional state, in order to improve HCI. The ability of a device to detect and respond to human emotions is known as "Affective Computing."

Automatic facial expression recognition is a key component in the research field of human computer interaction. Automatic facial expression recognition also plays a major role in human behavior modeling, which has significant potential in applications like video conferencing, gaming, surveillance, and the like. Most of the research in automatic facial recognition, however, is directed to identifying six basic emotions (sadness, fear, anger, happiness, disgust, surprise) on posed facial expression datasets prepared under controlled laboratory conditions. Researchers have adopted static as well as dynamic methods to infer different emotions in the facial expression datasets. Static methods analyze frames in a video sequence independently, while dynamic methods consider a group of consecutive frames to infer a particular emotion.

The mouth region of the human face contains highly discriminative information regarding the human emotion and plays a key role in the recognition of facial expressions. However, in a general scenario, such as, video conferencing, there will be significant temporal segments of the person talking, and any facial expression recognition system that relies upon the mouth region of the face of the person talk for inferring emotions may potentially be misled by the random and complex formations around the lip region. The temporal segment information regarding talking segments in a video sequence is quite important in this context as it can be used enhance the existing emotion recognition systems.

Few major works in the field of emotion recognition have addressed the condition of 'talking faces' under which the Action Units (AU) inferred for the mouth region may go potentially wrong, resulting in an erroneous emotion classification. Currently, known methods are directed at determining active speakers in a multi-person environment and do not intend to temporally segment lip activities of a single person into talking and non-talking (which includes neutral as well as various emotion segments) phases. As a result, the current systems suffer from drawbacks of failing to capture exact emotions.

Due to the abovementioned reasons, it is evident that there is a need for methods that intend to temporally segment lip activities into talking and non-talking phases and exact classification of emotions.

SUMMARY

An object of the example embodiments of the present disclosure herein is to provide a system and method for detecting talking segments in visual cues.

Another object of the present disclosure is to provide an unsupervised temporal segmentation method for detecting talking faces.

Accordingly, the present disclosure provides a method for detecting and classifying talking segments of a face in a visual cue, the method including normalizing and localizing the face region for each frame of the visual cue and obtains a histogram of structure descriptive features of the face for the frame in the visual cue. Further, the method derives an integrated gradient histogram (IGH) from the descriptive features for the frame in the visual cue, then computing entropy of the integrated gradient histogram (IGH) for the frame in the visual cue and then the method performs segmentation of the IGH to detect talking segments for the face in the visual cues and analyzing the segments for the frame in the visual cues for inferring emotions.

Accordingly, the present disclosure provides a computer program product for detecting and classifying talking segments of a face in a visual cue, the product including an integrated circuit. Further, the integrated circuit includes at least one processor, at least one memory having a computer program code within the circuit, the at least one memory and the computer program code configured to, with the at least one processor, cause the product to normalize and localize the face region for each frame of the visual cue. Then the computer program product obtains a histogram of structure descriptive features for the frame in the visual cue and derive integrated gradient histogram (IGH) from the descriptive features for the frame in the visual cue and compute entropy of the integrated gradient histogram (IGH) for the frame in the visual cue, further the computer program product perform segmentation of the IGH to detect talking segments for the face in the visual cues and analyze the segments for the frame in the visual cues for inferring emotions.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The present disclosure is illustrated in the accompanying drawings, throughout which like reference letters indicate corresponding parts in the various figures. The embodiments herein will be better understood from the following description with reference to the drawings, in which.

DETAILED DESCRIPTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein can be practiced and to further enable those of skill in the art to practice the embodiments herein. Accordingly, the examples should not be construed as limiting the scope of the embodiments herein.

The embodiments herein achieve a system and method to detect talking and non-talking segments in a sequence of image frames using visual cues. The method uses visual cues since, in this regard, audio cues may also come from different persons in range other than the target speaker and may mislead the detection. Moreover, the method is directed to classifying talking and non-talking segments, in which the non-talking segments may have different expressions with audio, such as, laughter, exclamation, and the like. Hence, visual cues may be used in distinguishing between the talking and non-talking segments. Depending on embodiments, the method identifies temporal segments of talking faces in video sequences by estimating uncertainties involved in the representation of mouth or lip movements. In an example embodiment, mouth movements are encoded onto an Integrated Gradient Histogram (IGH) of Local Binary Pattern (LBP) values after an initial mouth localization step. The uncertainties in the mouth movements are quantified by evaluating entropy of the IGH. The time series data of entropy values from each frame is further clustered using online K-Means algorithm to distinguish talking mouth patterns from other mouth movements.

The visual cues mentioned throughout the present disclosure may be a photograph, image frame, or video data containing a sequence of frames.

Figure 1:
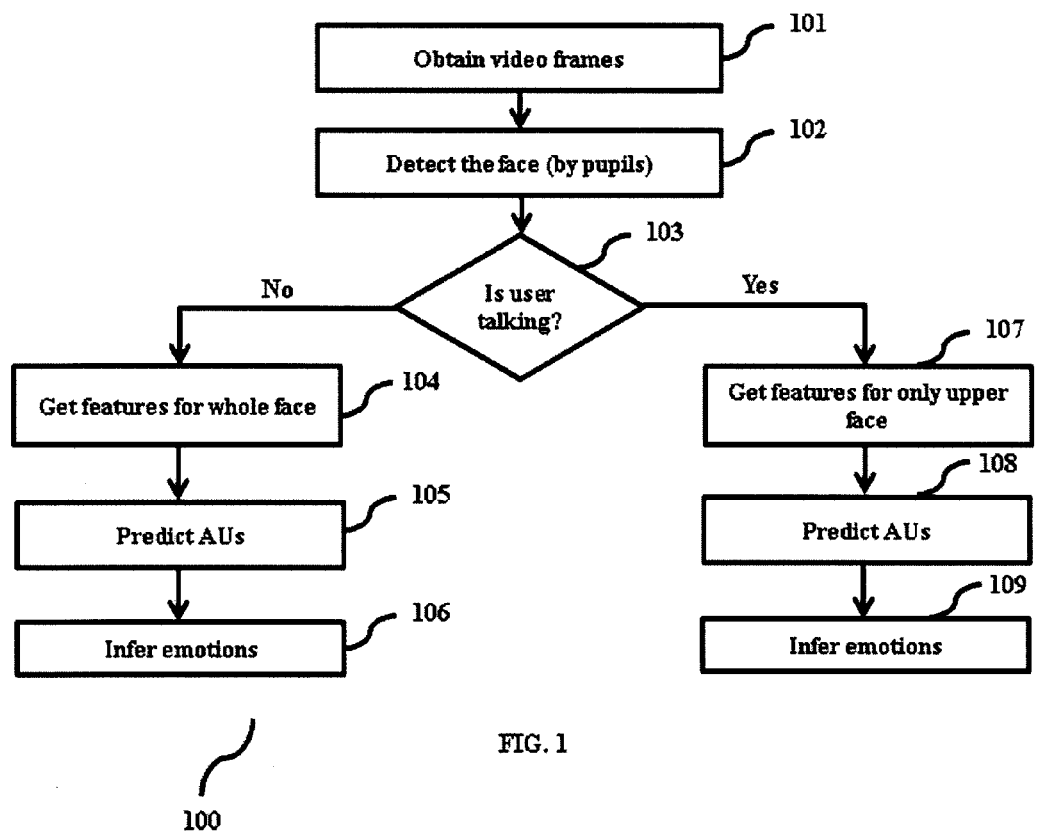
FIG. 1 illustrates a flowchart of an exemplary method of recognizing emotions of a character in a video sequence, according to example embodiments as disclosed herein.
Figure 2:
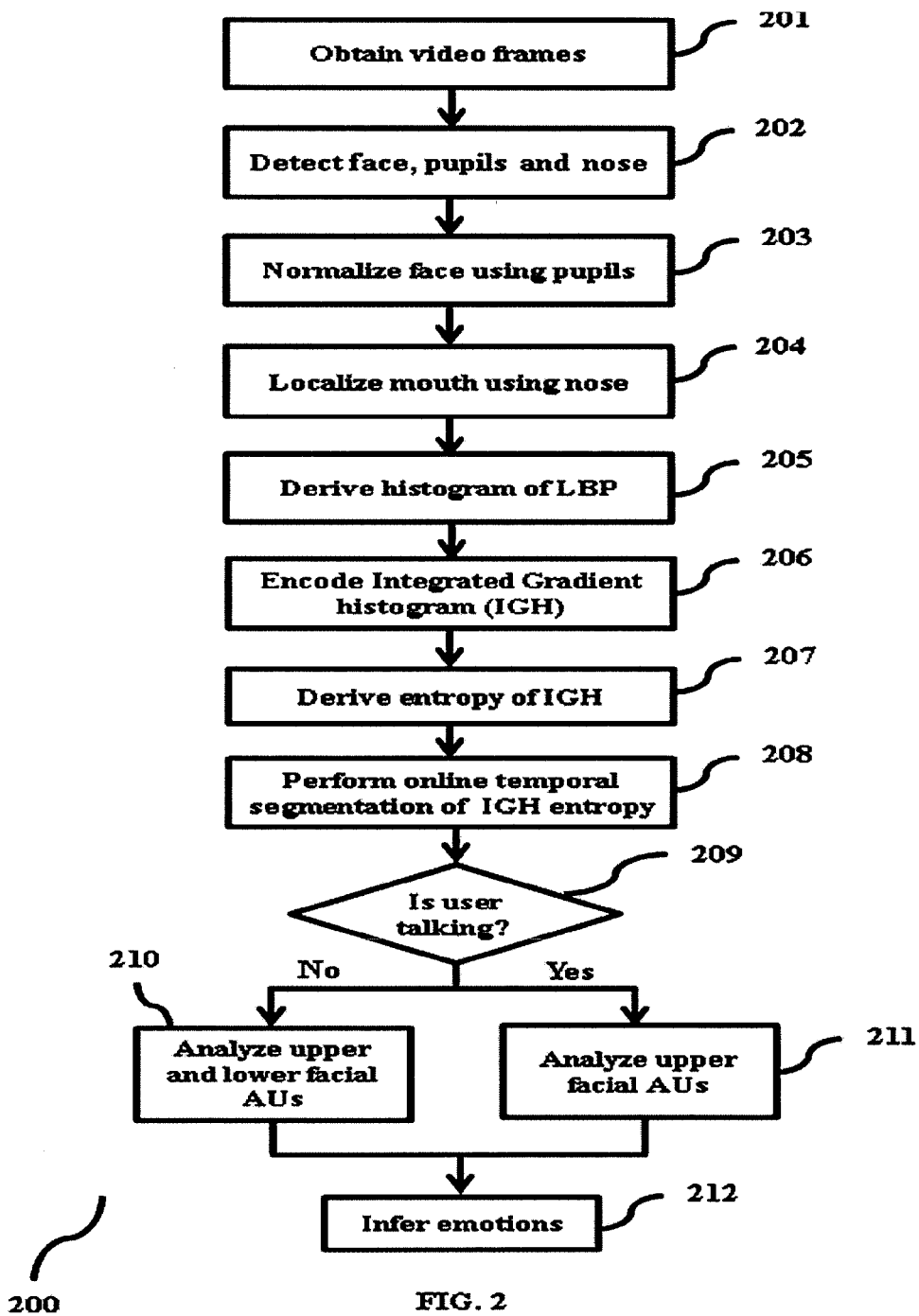
FIG. 2 illustrates a detailed flowchart of an exemplary method of detecting talking segments in video sequences using visual cues, according to example embodiments as disclosed herein.
Figure 3:
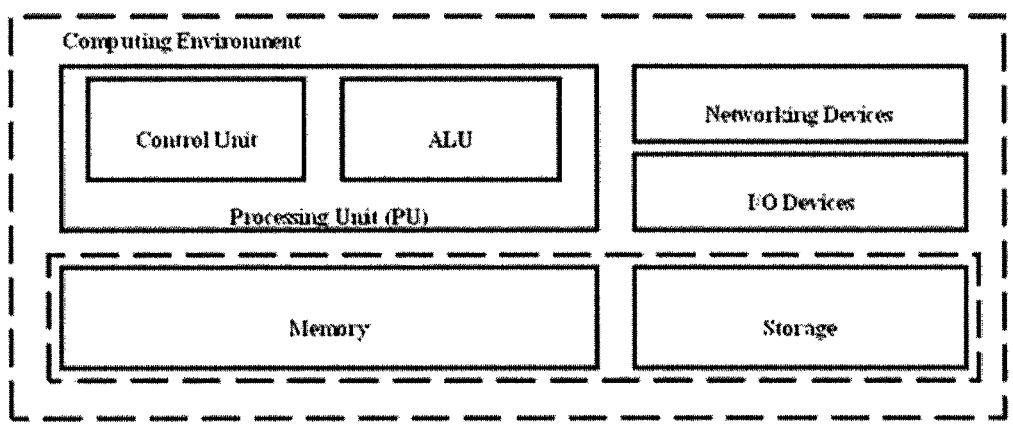
FIG. 3 illustrates a computing environment implementing the present disclosure, according to example embodiments disclosed herein.

Referring now to the drawings, and more particularly to FIGS. 1 through 3, where similar reference characters denote corresponding features consistently throughout the figures, there are shown example embodiments.

FIG. 1 illustrates a flowchart of an exemplary method of recognizing emotions of a character in a video sequence, according to example embodiments of the present disclosure. As depicted in FIG. 1, the method obtains video frames from the video in step 101, and it detects the face by anchoring the location of the pupils of the face in step 102. Next, the method checks whether the user is talking in step 103. If the method finds that the user is not talking, then the method gets the features of the whole face in step 104. Further, the method predicts the action units (AUs), which represent the muscular activity that produces facial appearance changes as defined by the Facial Action Coding System (FACS) in step 105. Based on the AUs, the method infers the emotions of the user in step 106. In an example embodiment, the method identifies that the user is talking, and then the method gets the features of only the upper portion of the face in step 107. Then the method predicts the AUs and then infers emotions of the user in step 109.

In an example embodiment, the talking face refers to a face that talks with or without any emotions. Further, a non-talking face refers to the face that does not talk, but does show some emotions. The various steps in method 100 of FIG. 1 may be performed in the order presented, in a different order than the order present, or simultaneously. Further, in some example embodiments, some steps listed in FIG. 1 may be omitted.

FIG. 2 illustrates a detailed flowchart of an exemplary method of detecting talking segments in video sequences, using visual cues, according to example embodiments as disclosed herein. As depicted in method 200 of FIG. 2, the method may employ an algorithm for performing the steps. The algorithm obtains a sequence of video frames in step 201, and further detects a primary face and localizes the pupils and nose of the primary face in step 202. In an example embodiment, a standard face detector and a version of Active Appearance Model (AAM) based method may be employed to identify the face, pupils, and nose locations in every frame of the video. The AAM is a generalization of the widely used Active Shape Model approach, but uses all the information in the image region covered by the target object, rather than just that near modeled edges. The method then normalizes the face using the pupils in step 203. The pupil locations are used to normalize every face image to M×N size. Further, the method localizes the nose that will crop out the mouth region in each frame for further processing in step 204.

In an example embodiment, the distance between the pupils is maintained as 48 pixels to normalize the faces and crop the mouth region to the size of 56×46 pixels.

The cropped sequence of mouth images may have variations of illumination and alignment across the frames and hence the method selects a feature descriptor that can handle such conditions. In an example embodiment, the method derives at least one histogram of Local Binary Pattern (LBP) values to encode the appearance of the mouth region in step 205. The LBP is a powerful feature used for texture classification which is later proven to be very effective with face recognition and related applications. In an example embodiment, the LBP pattern is computed for every pixel in the cropped out image of the mouth region. In addition, uniform LBP patterns (patterns with at most two bit wise transitions) may be similarly used and classified. The histogram of LBP values evaluated for the cropped image is used to describe the appearance of the mouth region in the respective frame.

Depending on embodiments, the system and method may distinguish the complex change of an appearance in the case of the talking mouth from the smoother appearance change of mouth movements exhibited in the onset and offset of emotions like smile, surprise, disgust, and the like. Further, for neutral faces with no talking involved there will not be much change in the appearance of the mouth. In an example embodiment, to distinguish the complex change, the gradient histograms are computed from a specific frame, say frame i, with the intention to capture the appearance changes over a time period 2τ. The gradient LBP histograms are computed, as follows:

$$H^i_n = H_i - H_{i+n}$$

$$H^i_{-n} = H_i - H_{i-n}$$

where $H^i_n$ is the gradient histogram computed using the difference between the histograms of the $i^{th}$ frame and the $(i+n)^{th}$ frame, and $H^i_{-n}$ is the gradient histogram computed using the difference between the histograms of the $i^{th}$ frame and the $(i-n)^{th}$ frame.

The gradient histograms encode the appearance changes in the mouth patterns along the temporal dimension. An example embodiment of the present disclosure takes the complete information regarding the appearance change over a time segment $2\tau+1$ and encodes the information into a single Integrated Gradient Histogram (IGH) in step 206, as follows:

$$IGH_i = \sum_{j=-\tau, j\neq 0}^{j=\tau} H^i_j$$

The series of talking frames will have more evenly distributed IGH values as compared to the frames displaying a particular emotion. In other words, the uncertainty involved in the IGH representation is more for talking segments as compared to the emotion segments. Hence, an example embodiment of the present disclosure performs online temporal segmentation of IGH entropy and uses the entropy of the IGH to quantify the amount of uncertainty in the video segment under consideration. The entropy of IGH of $i^{th}$ frame is calculated as follows:

$$Ep_i = -\sum_k p_k \log(p_k)$$

where $Ep_i$ is the entropy value of IGH of $i^{th}$ frame and $p_k$ is the histogram value for $k^{th}$ bin.

Further, the integrated gradient histogram is normalized before evaluating the entropy of the IGH. This arises from the need to compare the entropy values across different temporal segments. The energy values of the IGH over different temporal segments may vary as a result of the gradient process. The energy values are normalized by adding the common energy between the original LBP histograms as a separate bin in the IGH. For static segments, this common energy is a large spike in the IGH and may result in less entropy. For emotion segments, the common energy may be comparable to a slow talking process. However, the gradient energy part of IGH has a larger spread in talking segments and hence may have higher entropy compared to emotion segments. The temporal series data of entropy values evaluated from the IGH of every frame is used for unsupervised online segmentation of talking and non-talking faces.

In an example embodiment, the entropy values are obtained for every frame in the video sequence to form time series data. The time series data is then segmented in an unsupervised online fashion so as to provide the required input to the emotion recognition system regarding the presence of talking faces in the video sequence. In an example embodiment, the system may use online K-Means algorithm to segment the time series data where K=2. No further assumptions are made regarding the range or initial values of data.

The problem of inferring emotions in the presence of occlusions over the mouth region has been addressed to improve the accuracy of emotion detection. In FIG. 2, for example, the method checks whether the user is talking or not in step 209. In an example embodiment, the method determines that the mouth region is occluded whenever talking is detected. If the method finds that the user is not talking then it analyzes upper and lower facial AU's in step 210. In an example embodiment, the method finds that the user is talking, and a straightforward strategy could be to avoid the visual cues from the mouth region in a particular temporal segment. In an example embodiment, the method analyzes (211) the Action Units (AU) from the upper half of the face only. Then, the method infers emotions based on the talking or non-talking visual cues in step 212. It can be noted that, such a method will be inferior to the method using all AUs under normal conditions, but will be superior to the method using all AUs under talking conditions as the latter may have misleading information.

In another example embodiment, an improved emotion recognition is provided by using the mouth region but changing the strategy of recognition, once talking is detected. Even though image features from a talking face cannot be easily interpreted, the mouth region still holds some cues to the current emotion. For example, a happy talking face and a sad talking face may be discerned. It is to be noted that, the approach to infer emotions from talking faces using the mouth region would be different from a usual emotion recognition system. One skilled in the art will realize that movement of the lip corners may help distinguish certain emotions even while talking. The various steps in method 200 of FIG. 2 may be performed in the order presented, in a different order than the order presented, or simultaneously. Further, in some example embodiments, some steps listed in FIG. 2 may be omitted.

In an example embodiment, the method may be used in video conferring, meeting or interview scenario, in which the camera is focused to the person. In addition, the method may detect the talking and non-talking faces of the person involved in the session and determine the emotions of that person. Further, the method may also be employed in emotion recognition systems for better categorizing of the emotions.

FIG. 3 illustrates an apparatus or computing environment implementing the present disclosure, according to example embodiments disclosed herein. As depicted, the computing environment comprises at least one processing unit that is equipped with a control unit and an Arithmetic Logic Unit (ALU), a memory, a storage unit, plurality of networking devices, and a plurality Input/Output (I/O) devices. The processing unit is responsible for processing the instructions of the algorithm. The processing unit receives commands from the control unit in order to perform its processing. Further, any logical and arithmetic operations involved in the execution of the instructions are computed with the help of the ALU.

The overall computing environment can be composed of multiple homogeneous and/or heterogeneous cores, multiple CPUs of different kinds, special media and other accelerators. The processing unit is responsible for processing the instructions of the algorithm. The processing unit receives commands from the control unit in order to perform its processing. Further, any logical and arithmetic operations involved in the execution of the instructions are computed with the help of the ALU. Further, the plurality of process units may be located on a single chip or over multiple chips.

The algorithm including instructions and codes required for the implementation are stored in either the memory unit or the storage or both. At the time of execution, the instructions may be fetched from the corresponding memory and/or storage, and executed by the processing unit.

In case of any hardware implementations various networking devices or external I/O devices may be connected to the computing environment to support the implementation through the networking unit and the I/O device unit.

The embodiments disclosed herein can be implemented through at least one software program running on at least one hardware device and performing network management functions to control the elements. The elements shown in FIG. 3 include blocks which can be at least one of a hardware device, or a combination of a hardware device and a software module.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on non-transitory computer-readable media comprising computer-readable recording media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc—Read Only Memory), and a CD-R (Recordable)/RW.

Further, according to an aspect of the embodiments, any combinations of the described features, functions and/or operations can be provided.

Moreover, the apparatus or computing environment implementing the present disclosure, as shown in FIG. 3 for example, may include at least one processor to execute at least one of the above-described units and methods.

The foregoing description of the specific embodiments will so fully reveal the general nature of the example embodiments herein that others may, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the example embodiments herein have been described in terms of preferred embodiments, those skilled in the art will recognize that the embodiments herein can be practiced with modification within the spirit and scope of the embodiments as described herein.

What is claimed is:

1. A method for detecting and classifying talking segments of a face in a visual cue in order to infer emotions, the method comprising:
    normalizing and localizing a face region for each frame of the visual cue;
    obtaining a histogram of structure descriptive features of the face for the frame in the visual cue;
    deriving an integrated gradient histogram (IGH) from the descriptive features for the frame in the visual cue;
    computing entropy of the IGH for the frame in the visual cue;
    performing segmentation of the IGH to detect talking segments for the face in the visual cues; and
    analyzing the segments for the frame in the visual cues to infer emotions.

2. The method of claim 1, wherein the normalizing comprises employing pupil location to normalize a face image of the face for the frame of the visual cue.

3. The method of claim 1, wherein the localizing comprises employing nose location to crop a mouth region in an accurate manner for the frame of the visual cue.

4. The method of claim 1, wherein the deriving of the IGH comprises obtaining an uncertainty involved in the IGH representation for talking segments as compared to non talking segments.

5. The method of claim 1, wherein the entropy of the IGH is computed for determining an amount of uncertainty involved in talking segments in the visual cue.

6. The method as in claim 1, wherein the analyzing comprises employing upper facial action units (AUs) for inferring emotions of the talking faces.

7. The method as in claim 1, wherein the analyzing comprises employing entire facial action units (AUs) for inferring emotions of non talking faces.

8. The method as in claim 1, wherein the visual cue is at least one of an image frame and video data comprising a sequence of frames.

9. A non-transitory computer readable recording medium storing a program for detecting and classifying talking segments of a face in a visual cue, the program comprising instructions for causing a computer to implement the steps of claim 1.

10. A computer program product for detecting and classifying talking segments of a face in a visual cue, the product comprising:
    an integrated circuit further comprising at least one processor;
    at least one memory having a computer program code within the integrated circuit;
    the at least one memory and the computer program product configured to, with the at least one processor, cause the product to:
    normalize and localize a face region for each frame of the visual cue;
    obtain a histogram of structure descriptive features for the frame in the visual cue;
    derive an integrated gradient histogram (IGH) from the descriptive features for the frame in the visual cue;
    compute entropy of the IGH for the frame in the visual cue;
    perform segmentation of the IGH to detect talking segments for the face in the visual cue; and
    analyze the segments for the frame in the visual cue for inferring emotions.

11. The computer program product of claim 10, wherein the normalizing comprises employing pupil location to normalize a face image for the frame of the visual cue.

12. The computer program product of claim 10, wherein the localizing comprises employing nose location to crop a mouth region in an accurate manner for the frame of the visual cue.

13. The computer program product of claim 10, wherein the deriving of the IGH comprises obtaining an uncertainty involved in the IGH representation for talking segments as compared to non-talking segments.

14. The computer program product of claim 10, wherein the entropy of the IGH is computed for determining an amount of an uncertainty involved in talking segments in the visual cue.

15. The computer program product of claim 10, wherein the analysis comprises employing upper facial action units (AUs) for inferring emotions for talking faces.

16. The computer program product of claim 10, wherein the analysis comprises employing entire facial action units (AUs) for inferring emotions for non-talking faces.

17. A method for detecting talking and non-talking segments in a sequence of image frames, the method comprising:
    detecting, by a processor, a face region in the sequence of image frames by anchoring a location of pupils of a face;

determining whether the face of the face region is talking or not talking;

when the face is not talking, obtaining features of an entire portion of the face;

when the face is talking, obtaining features of an upper portion of the face; and inferring at least one emotion of the face region using action units that are predicted based on the obtained features.

18. The method of claim 17, wherein the action units represent muscular activity producing facial appearance changes as defined a Facial Action Coding System (FACS).

19. The method of claim 17, wherein the face of the face region is normalized using the location of the pupils and a nose of the face is localized.

20. The method of claim 17, wherein a mouth region of the face of the face region is cropped to a cropped region, and the cropped region is encoded using a histogram of Local Binary Pattern (LBP) values.

* * * * *